STUART DUNCAN DAVIES
JOHN ALFRED CHILMAN
INVENTORS

Sept. 23, 1969   S. D. DAVIES ET AL   3,468,473
GAS TURBINE ENGINES

Filed April 12, 1967   7 Sheets-Sheet 3

STUART DUNCAN DAVIES
JOHN ALFRED CHILMAN
INVENTORS

BY Young & Thompson
ATTORNEYS

Sept. 23, 1969  S. D. DAVIES ET AL  3,468,473
GAS TURBINE ENGINES

Filed April 12, 1967  7 Sheets-Sheet 4

STUART DUNCAN DAVIES
JOHN ALFRED CHILMAN
INVENTORS

BY Young + Thompson

ATTORNEYS

STUART DUNCAN DAVIES
JOHN ALFRED CHILMAN
INVENTORS

BY Young & Thompson
ATTORNEYS

United States Patent Office 3,468,473
Patented Sept. 23, 1969

3,468,473
GAS TURBINE ENGINES
Stuart Duncan Davies and John Alfred Chilman, Painswick, England, assignors to Dowty Rotol Limited, Gloucester, England
Filed Apr. 12, 1967, Ser. No. 630,256
Claims priority, application Great Britain, May 25, 1966, 23,429/66; Feb. 3, 1967, 5,267/67
Int. Cl. F04d 27/00; F02k 3/02, 1/02
U.S. Cl. 230—114                                          19 Claims

ABSTRACT OF THE DISCLOSURE

A gas turbine engine of the ducted-fan by-pass type includes a fan assembly rotatable in a by-pass duct and having flow-varying blading tiered to provide two annular flow paths the inner of which charges the engine compressor while the outer charges the duct. The pitch of one of the tiers of blading is adjustable under the control of a pitch-changing mechanism housed within a hub of the fan assembly. The outer tier of blading is conveniently of adjustable pitch, with the inner tier of blades of fixed pitch and hollow for the passage of radial transmission shafts which effect pitch changing of the outer tier of blades through reduction gearing at the outer ends of the transmission shafts.

---

Figure 1:
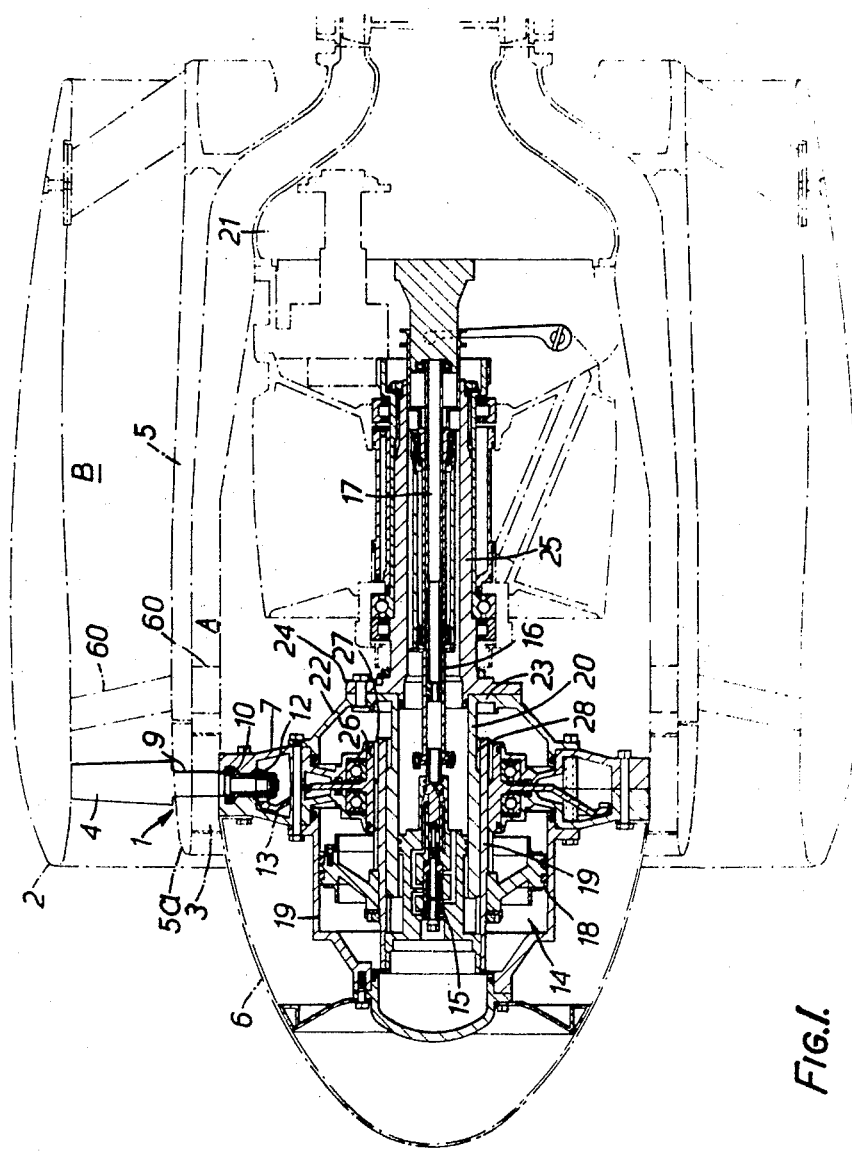

This invention relates to gas turbine engines and more particularly to gas turbine engines of the ducted-fan by-pass type.

According to the invention a gas turbine engine of the by-pass type includes a fan having flow-varying blading and rotatable in a by-pass duct, the said blading being tiered to provide at least two concentric annular flow paths, the blading portions of at least one such flow path being either adjustable relatively with respect to the blading portions of the other flow path or flow paths, or being adjustable in unison with such blading portions of the said other flow path or flow paths thereby to afford the flow variation.

The fan may be mounted ahead of the engine compressor thereby to charge both the compressor and the by-pass duct, the blading portions of one flow path being separated from the blading portions of the adjacent flow path by shrouding. The blading portions of an outer flow path may be of variable pitch, the pitch being preferably adjustable under the control of a servo system housed, at least in part, within the hub of the fan and being controlled either by manual input signals or speed-governor signals.

Preferably the blading portions of an inner flow path comprise hollow blades and the blade-operating gear for the blading portions of an outer flow path comprise radially arranged transmission shafts passing outwardly through the hollow blades of such inner flow path and rotatable from said servo system disposed in the hub to effect pitch changing of the blades of the said outer flow path. Alternatively, the blading of the outer flow path may have elongated blade roots which pass through the hollow blades for connection to the servo system within the hub of the fan. If desired the blading portions of at least one flow path may be of fixed pitch and, according to a feature of the present invention, the blading portions of an inner flow path are of fixed pitch while the blading portions of an outer flow path are of variable pitch.

The servo system may comprise a hydraulic or electric motor, the output member of the system being arranged to drive the aforesaid transmission shafts which pass through hollow blades of fixed pitch of an inner flow path and drive mechanical means connected to the blades of variable pitch of an outer flow path to afford pitch variation. The said mechanical means preferably comprise speed-reducing gearing.

Thus, each of the aforesaid transmission shafts may carry a relatively small gear at its outer end which meshes with two relatively large gears arranged one on either side of it in a circumferential sense, said larger gears being associated coaxially with the blade roots of the blading of the outer flow path, the blades of the inner and outer flow paths being accordingly circumferentially staggered or offset with relation to one another. Alternatively the relatively small gear at the outer end of the transmission shaft may constitute the sun wheel of an epicyclic gear, planetary pinions meshing with the sun wheel and with a toothed annulus fixed to the blade roots of the blading of the outer flow path. In such case, as will readily be seen, the blades of the inner and outer flow paths will be radially aligned with each other, and not offset or staggered as before.

While advantages result with the invention applied to simple single-shaft engines in that it enables a constant and independent supply of combustion air by the inner flow path to the engine and a variable supply of air by the outer flow path to the by-pass, with the ability to vary the by-pass ratio to suit the instantaneous flying requirements, even greater benefits accrue by the application of the invention to two-spool or multi-spool engines and one example of the invention as carried into effect in connection with such a split compressor engine will be subsequently described herein.

The fan assembly, including the pitch-change mechanism for one or more tiers of blading, conveniently forms a rotative assembly which may be bolted as a unit to a fan drive shaft, which may be for example an engine reduction gearbox shaft or the shaft of a free turbine by which the fan is driven. A ring of fixed, i.e. non-rotatable, stator blades will normally be positioned in the by-pass duct aft of the fan. This stator blading may also be of fixed or variable pitch, and in the latter case pitch variation may be controlled through a differential unit which correlates the pitch settings of the stator blading and the corresponding tier of fan blading. Such a differential unit may be arranged in a mechanical pitch control linkage, and have a single lever input and two output levers connected to the pitch-change mechanisms differentially controlled by the unit, in the sense that they are controlled according to a predetermined relationship. A similar type of unit may be used to provide differential control of two individual tiers of the fan blading.

Figure 2:
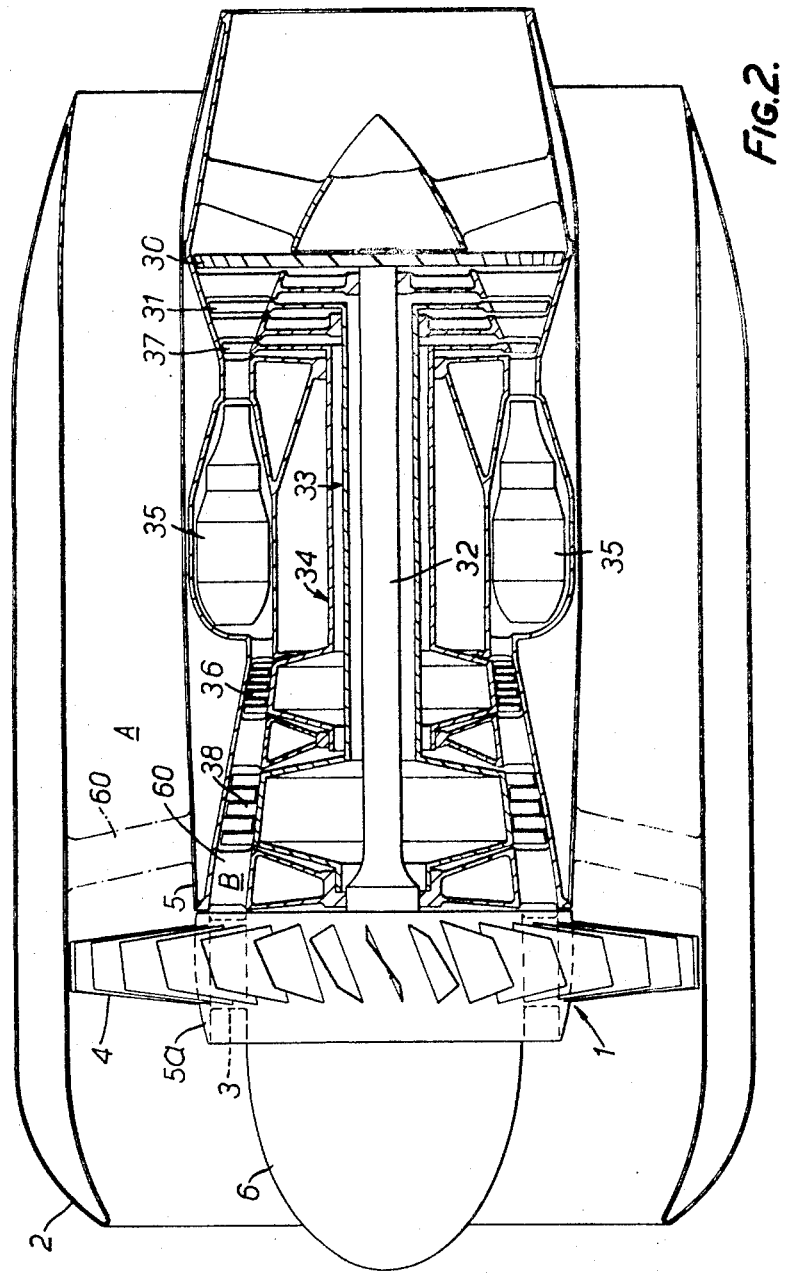
Figure 3:
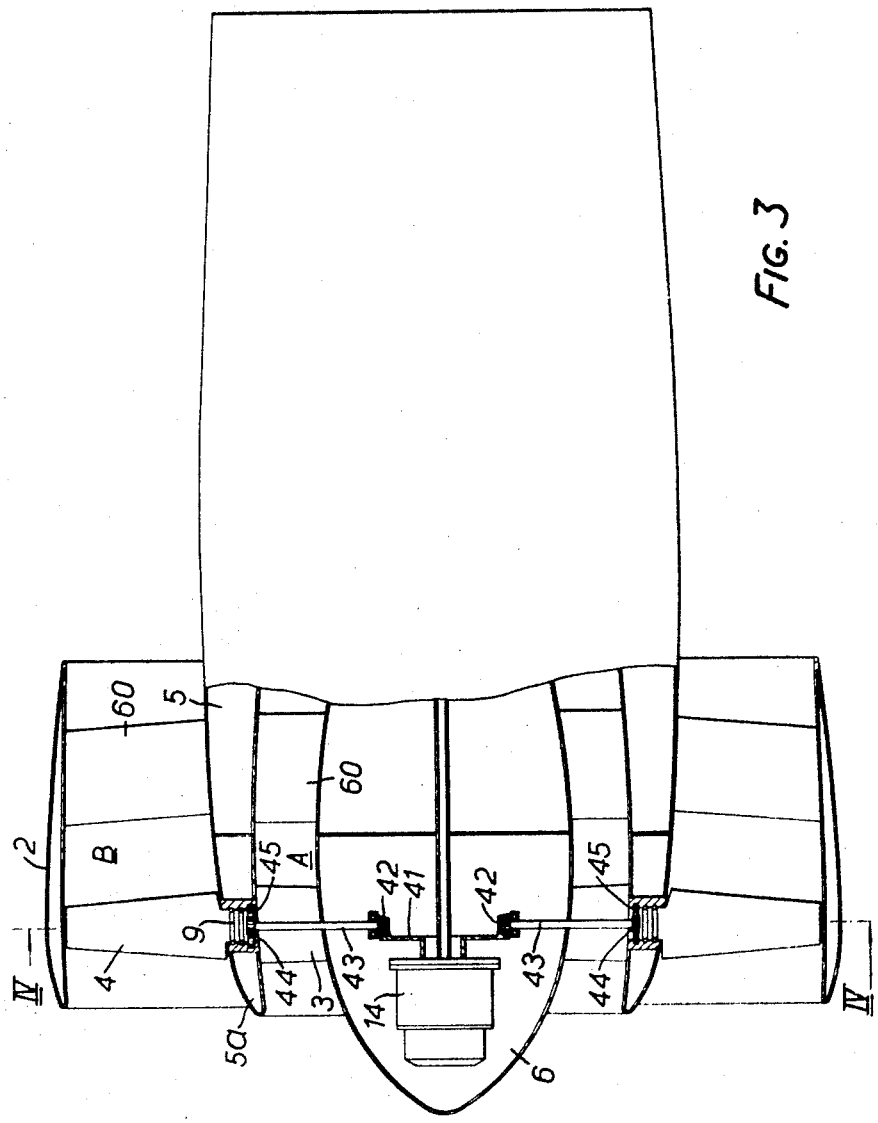
Figure 4:
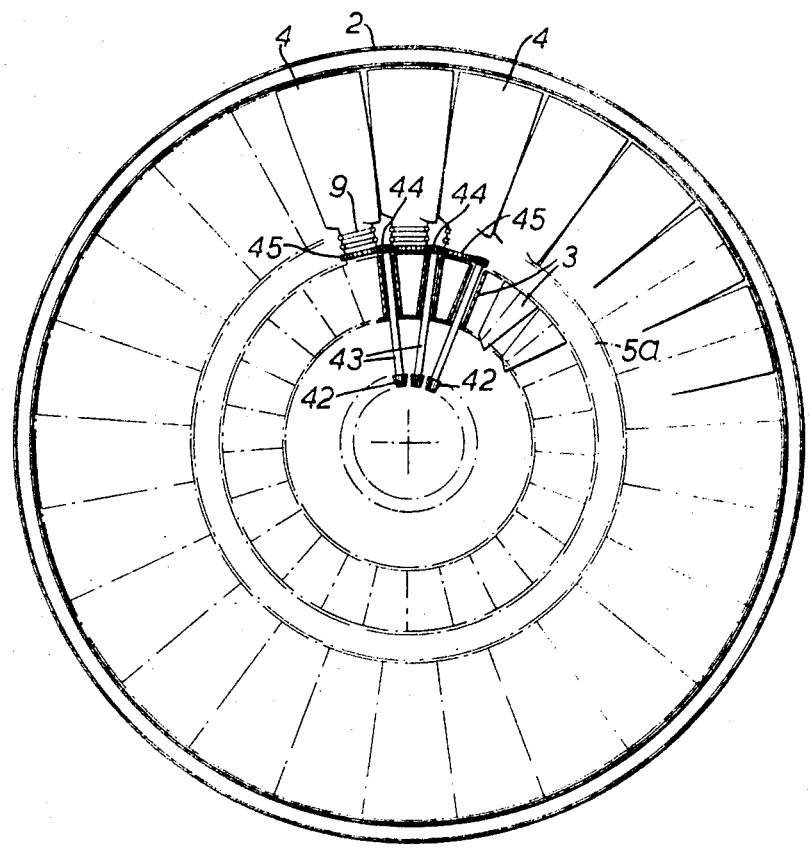

The invention will now be further described with reference to the accompanying drawings which illustrate, by way of example, tiered fans in accordance with the invention associated with two different types of engine and a number of alternative pitch control arrangements. In the drawings:

FIGURE 1 is an axial sectional view of the forward end of one of the engines,

FIGURE 2 is a side view of the other engine with the main engine components illustrated diagrammatically in axial section, FIGURE 3 illustrates diagrammatically, and partly in axial section, an alternative fan blade pitch control arrangement, FIGURE 4 is a sectional view mainly on the line IV—IV of FIGURE 3, and FIGURES 5 to 7 illustrate three further alternative control arrangements again somewhat diagrammatically.

Each of the engines is of the by-pass type and includes a fan, indicated generally by the reference 1, rotatable in a by-pass duct 2. The fan 1 is mounted at the forward end of the engine and is two-tiered; that is to say it consists of inner and outer annular blading portions 3 and 4 to provide two concentric annular flow paths A and B for the intake air. The fan 1 provides a complete rotative assembly which is bolted as a whole to the shaft by which it is driven, and the assembly includes the forward portion 5a of an otherwise fixed shroud ring 5 which separates the inner and outer flow paths A and B from each other and thus forms an annular splitter. The duct 2 provides an external shroud ring encircling the outer blading portions 4 the blade tips of which are a close running fit in the duct 2.

Within the inner shroud ring 5 is a spinner 6 which provides a rotary fairing for the hub 7 of the fan which in turn houses a servo system by means of which pitch variation of the fan blading is effected. The forward rotative portion 5a of the inner shroud ring 5 overlaps the spinner 6 and is rigidly connected to the latter through the inner blading portions 3. The blades of both the inner and outer blading portions 3 and 4 are wide, the chordal width of the inner blading portions 3 being somewhat greater than that of the outer portions 4. On the other hand the inner blading portions 3 are relatively short as compared with the length of the outer blading portions 4. The fan has a large multiplicity of blades, for example seventeen or even more inner blading portions 3 and the same number of outer blading portions 4.

The internal details of the fan assemblies 1 of the engines of FIGURES 1 and 2 are basically similar, these details being illustrated in FIGURE 1 with reference to which the operation of the pitch-change mechanism will now be described in sufficient detail to allow the functioning thereof to be understood. It will be appreciated that the form of mechanism concerned is illustrated merely by way of example and that alternative types of mechanism may be employed. The inner blading portions 3 are of fixed pitch and of hollow aerofoil section. At their radially inner ends they are connected to the spinner 6 which is bolted to the fan hub 7, while at their radially outer ends they are fixed to the rotative inner shroud ring portion 5a.

As will be seen, the blade roots 9 of the outer blading portions 4 are elongated and pass through the shroud ring portion 5a and the hollow inner blading portions 3 into the fan hub 7 in which they are rotatably supported by bearings 10. Pitch variation of the outer blading portions 4 is effected by mechanical means embodying reduction gearing, comprising a multiplicity of small pinions 12 which are respectively fast on the blade roots 9 and mesh with a relatively large bevel gear 13 rotatably supported within the hub 7 coaxially thereof. The said servo system by which the blade pitch of the outer blading portions 4 is controlled comprises a pitch-change motor 14 of the piston and cylinder type, of which the gear 13 is the output member, and a follow-up servo valve 15 which operates under manual input signals applied through an axially movable pitch control tube 16 connected to the valve 15. It will be appreciated that pitch variation may alternatively be effected under the control of speed governor signals, and the hydraulic servo motor 14 is fed with oil through a pipe 17 passing forwardly from the engine and axially of the latter, the oil flow in part being carried by the control tube 16 after leaving the pipe 17.

The motor 14 has a piston assembly 18 slidable in a forwardly projecting cylinder 19 bolted to the hub 7, and this assembly has a tubular and rearwardly projecting portion 19 which slides on a forwardly projecting hollow cylindrical spigot 20 formed integrally with a casing 22 bolted to the rear side of the hub 7. The casing 22 has a rear wall 23 which enables the complete rotative assembly to be bolted to and supported on a flange 24 at the front end of a fan drive shaft 25.

The helical gear 13 has a boss 26 with internal helical spline teeth which mesh at 27 with complementary teeth on the outer surface of the piston portion 19, thereby to convert axial movement of the piston assembly 18 to rotary pitch-change movement of the gear 13. The portion 19 has straight internal spline teeth which mesh at 28 with complementary external teeth formed on the spigot 20, and this prevents rotation of the assembly 18 relatively to the hub 7.

As will be seen from FIGURE 1, the drive shaft 25 is driven from a reduction gearbox 21 provided at the front of the compressor of the engine which may be of the single-shaft type. The engine of FIGURE 2, on the other hand, is of the two-spool type with the fan 1 driven by a free turbine 30 aft of the L.P. turbine stage 31 of the engine through a shaft 32 passing through the L.P. and H.P. assemblies 33 and 34. The engine has the usual combustion system 35 disposed between the H.P. compressor 36 and the H.P. turbine 37, with the inner flow path B supplying the L.P. compressor 38.

In the arrangement of FIGURES 3 and 4 the blade roots 9 of the outer blading portions 4 are rotatably mounted in the inner shroud ring portion 5a. The output member of the servo motor 14 again comprises a bevel gear 13, but in this case the gear 13 meshes with small bevel gears 42 fixed to the inner ends of transmission shafts 43 passing radially outwards through the hub, one through each inner blading portion 3, such inner blading portion again being made hollow to receive them. At their outer ends the transmission shafts 43 each carry a small gear 44 which meshes with two relatively large gears 45 arranged one on either side of its in a circumferential sense, as shown clearly in FIGURE 4. Each large gear 45 is fixed to a blade root 9, the arrangement being such that rotation of the transmission shafts 43 by the servo motor 14 effects angular adjustment of the outer blading portions 4 about their axes at a lower speed and all in unison. As is also clear from FIGURE 4, each of the relatively large gears is coaxial with one of the outer blading portions.

From the foregoing description and FIGURES 3 and 4 it will be seen that the outer variable pitch blading portions 4 and the inner fixed pitch blading portions 3 are offset with relation to one another in a circumferential sense. With this arrangement it will be seen that a speed reduction is obtained between the variable pitch blading portions 4 and the transmission shafts 43 which thereby permits the required power to provide the necessary twisting moment to be passed through each fixed inner blading portion by means of a small diameter shaft.

Figure 5:
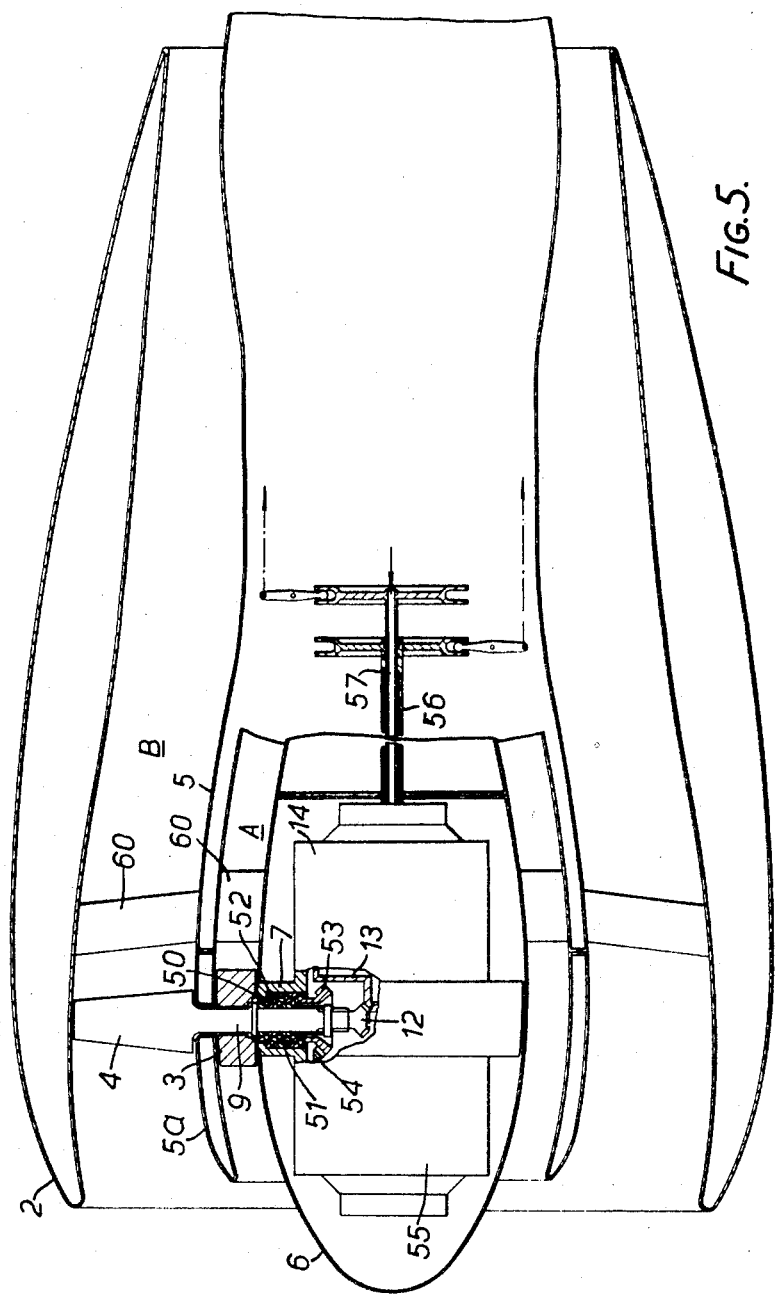
Figure 6:
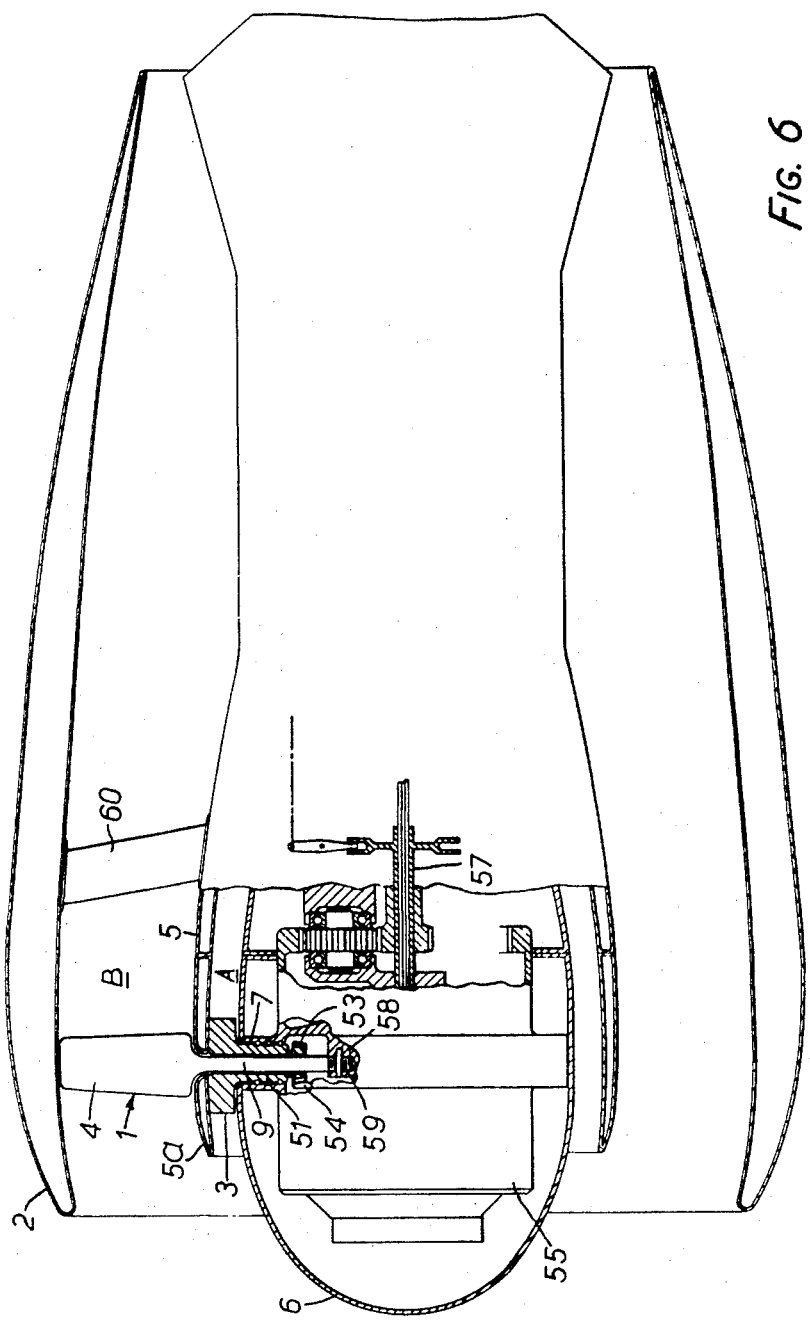

As a result of the invention a practical arrangement providing a variable by-pass is achieved, the inner and outer hot and cold air flows A and B respectively being effectively separated by the inner shroud ring 5. With the described arrangement of fixed inner blading 3 and variable pitch outer blading 4 the fan system is enabled to maintain the engine air flow A substantially constant whilst the cold air flow B is changed to meet the changing requirements of flight. In some cases it may be desirable to have the fan 1 adjustable to vary the flow A and thus provide, in effect, variable supercharging of the engine compressor. FIGURES 5 and 6 illustrate two alternative control arrangements which enable this to be done.

In FIGURE 5 the outer blading portions 4 again have elongated blade roots 9 which extend through the inner shroud ring portion 5a and the hollow inner blading portions 3 for connection to the servo motor 14 which, in this case, is disposed at the rear end of the hub 7. As before, a bevel gear 13 which provides the output member of the motor 14 meshes with a multiplicity of pinions 12 fast on the blade roots 9. However, the blade roots 9 are now rotatably supported in bearings 50 within hollow blade roots 51 of the inner blading portions 3, the latter themselves being rotatably mounted in the hub 7 in bearings 52. At its inner end each hollow blade root 51 is formed with bevel teeth 53 which mesh with a second bevel gear 54 forming the output member of a second servo motor 55 arranged at the front end of the hub 7. Coaxial pitch control tubes 56 and 57 are respectively connected to servo valves of the motors 14 and 55, as before, and serve to provide manual input signals for the separated control of the motors 14 and 15 so that the pitch of the inner and outer blading portions 3 and 4 can be varied separately and independently.

Pitch variation of the inner blading portions 3 of the arrangement illustrated in FIGURE 6 is similarly achieved by a servo motor 55 with a control valve connected to a pitch control tube 57. As before, a bevel gear 54 forming the output member of the motor 55 meshes with bevel teeth 53 formed at the inner ends of hollow blade roots 51 of the inner blading portions 3. In this case no provision is made for varying the pitch of the outer blading portions 4 which are of fixed pitch and the blade roots 9 extend with clearance through the blade roots 51 to the centre 58 of the hub 7 into which they are screwed and pinned at 59.

Figure 7:
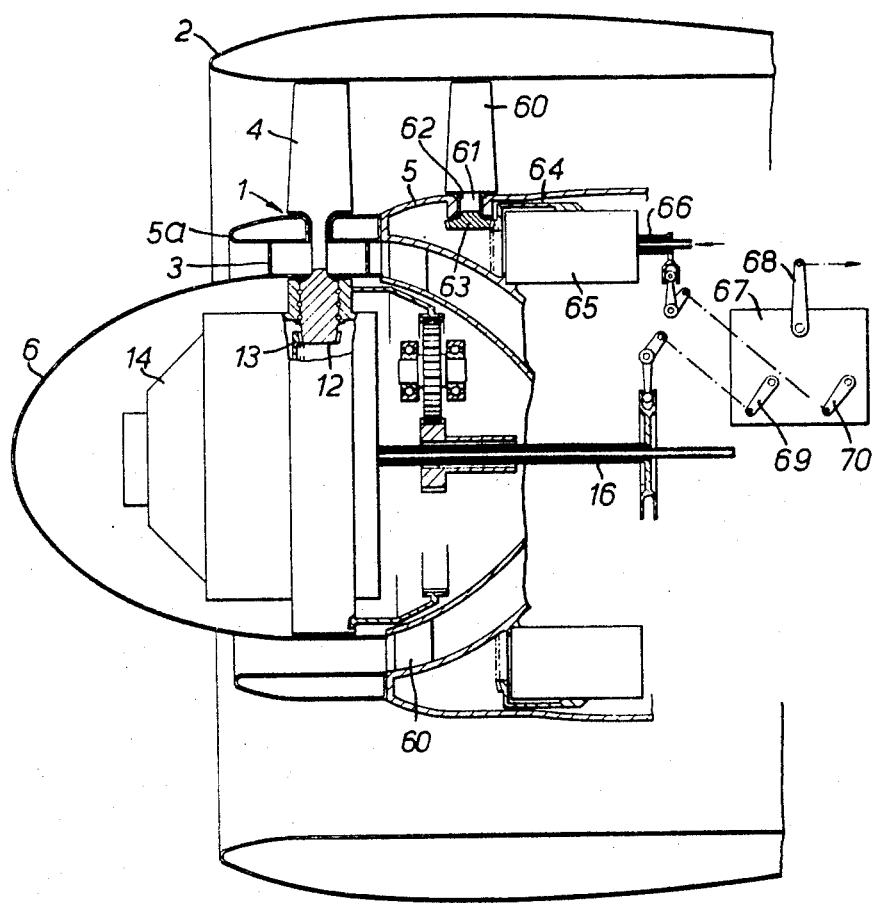

A ring of stator blades 60 is in each construction positoned within the duct 2 and also within the shroud ring 4 aft of the fan 1, and in the arrangements so far described these blades are of fixed pitch. FIGURE 7 alternatively illustrates an arrangement in which the stator blades 60 are of variable pitch, the pitch variation thereof being automatically correlated with pitch variation of the outer blading portions 4. The arrangement of the fan 1 is otherwise generally as described with particular reference to FIGURE 1, an axially movable pitch control tube 16 being connected to a servo valve of the pitch-change motor 14. The stator blades 60 have blade roots 61 rotatably mounted in bearings 62 in the inner shroud ring 5, each blade root 61 having fast thereon a pinion 63 which meshes with a bevel gear 64 of another pitch-change motor 65 of the general type already described. A servo valve of the motor 65 is, as before, connected to an axially movable pitch control tube 26.

Pitch changes of the outer blading portions 4 and the stator blades 60 are correlated by a differential unit 67 forming part of the mechanical control linkage for effecting pitch variation and having a single lever input 68. Control movement of the lever 68 results in the correct differential movement of two output levers 69 and 70 which are respectively linked to the pitch control tubes 16 and 66.

We claim:
1. A gas turgine engine having a by-pass duct, a single-stage fan having flow-varying blading and rotatable in said by-pass duct, said blading being tiered to provide at least two concentric annular flow paths, and means for adjusting the position of the blading portions of at least one such flow path thereby to afford the flow variation, the blading portions of an inner flow path being of variable pitch.

2. A gas turbine engine having a compressor and a by-pass duct, a single-stage fan having flow varying blading and rotatable in said by-pass duct, said blading being tiered to provide at least two concentric annular flow paths one through said compressor and another through said by-pass duct, and means for adjusting under remote control the position of the blading portions of at least one such flow path thereby to afford the flow variation, the fan being mounted ahead of the engine compressor thereby to charge both the compressor and the by-pass duct.

3. A gas turbine engine according to claim 2, the fan blading portions of one flow path being separated from the fan blading portions of the adjacent flow path by shrouding.

4. A gas turbine engine according to claim 2 wherein a ring of stator blades of variable pitch is positioned in the by-pass duct aft of the fan.

5. A gas turbine engine according to claim 4, wherein pitch variation of the stator blading is controlled through a differential unit which correlates the pitch settings of the stator blading and the corresponding tier of fan blading.

6. A gas turbine engine having a compressor and a by-pass duct, a single-stage fan having flow-varying blading and rotatable in said by-pass duct, said blading being tiered to provide two concentric annular flow paths one through said compressor and another through said by-pass duct, the blading portions of the inner flow path being of fixed pitch while the blading portions of the outer flow path are of variable pitch, and means for adjusting the pitch of the outer blading portions under remote control, the fan being mounted ahead of the engine compressor thereby to charge both the compressor and the by-pass duct.

7. A gas turbine engine of the by-pass type having a by-pass duct, a fan having flow-varying blading and rotatable in said by-pass duct, said blading being tiered to provide two concentric annular flow paths, the blading portions of the inner flow path being of fixed pitch while the blading portions of the outer flow path are of variable pitch and adjustable under the control of a servo system housed, at least in part, within the hub of the fan.

8. A gas turbine engine according to claim 7, wherein the blading portions of the inner flow path comprise hollow blades and the blade-operating gear for the blading portions of the outer flow path comprise radially arranged transmission shafts passing outwardly through the hollow blades of such inner flow path and rotatable from said servo system within the hub of the fan.

9. A gas turbine engine according to claim 8, wherein the servo system comprises a power driven motor, the output member of the system being arranged to drive said transmission shafts which pass through hollow blades of fixed pitch of an inner flow path and drive mechanical means connected to the blades of variable pitch of said outer flow path to afford pitch variation.

10. A gas turbine engine according to claim 7, wherein the blading of the outer flow path has elongated blade roots which pass through the hollow blades for connection to the servo system within the hub of the fan.

11. A gas turbine engine having a by-pass duct, a fan having flow-varying blading and rotatable in said by-pass duct, said blading being tiered to provide two concentric annular flow paths, the blading portions of an inner flow path comprising hollow blades while the blade-operating gear for the blading portions of an outer flow path comprise radially arranged transmission shafts passing outwardly through the hollow blades of such inner flow path and rotatable from a servo system disposed in the fan hub to effect pitch changing of the blades of said outer flow path through reduction gearing at the outer ends of said radially arranged transmission shafts.

12. A gas turbine engine according to claim 11, wherein each of said transmission shafts carries a relatively small gear at its outer end which meshes with two relatively large gears arranged one on either side of it in a circumferential sense, said larger gears being associated coaxially with the blade roots of the blading of the outer flow path and the blades of the inner and outer flow paths being accordingly circumferentially staggered or offset with relation to one another.

13. A gas turbine engine according to claim 11, wherein each of said transmission shafts carries a relatively small gear at its outer end which constitutes the sun wheel of an epicyclic gear, planetary pinions of which mesh with the sun wheel and with a toothed annulus fixed to the blade roots of the blading of the outer flow path.

14. A gas turbine engine of the by-pass type having a by-pass duct, a fan assembly having flow-varying blading and rotatable in said by-pass duct, the blading being tiered to provide two concentric annular flow paths the inner of which flow paths charges the engine compressor while the outer charges the by-pass duct, the pitch of one of the tiers of blading being adjustable under the control of a pitch-changing mechanism housed within a hub of the fan assembly.

15. A gas turbine engine according to claim 14, wherein the other tier of fan blading is of fixed pitch.

16. A gas turbine engine according to claim 14, wherein the fan assembly forms a rotative assembly for bolting as a unit to a fan drive shaft.

17. A gas turbine engine according to claim 14, wherein the engine of the single-shaft type with the fan driven through a reduction gearbox.

18. A gas turbine engine having a by-pass duct, a fan having flow-varying blading and rotatable in said by-pass duct, said blading being tiered to provide at least two concentric annular flow paths, means for varying the pitch of the blading portions of at least one such flow path, a ring of stator blades of variable pitch positioned in the by-pass duct aft of the fan, and a mechanical pitch control linkage including a differential unit which correlates the pitch settings of the stator blading and the corresponding tier of fan blading, the differential unit having a single input lever and two output levers connected respectively to pitch-change mechanisms differentially controlled by the unit.

19. A gas turbine engine of the plural-spool type and having a by-pass duct, a fan having flow-varying blading and rotatable in said by-pass duct, the engine having a free turbine disposed aft of an L.P. turbine stage of the engine and driving the fan through a shaft passing through L.P. and H.P. assemblies of the engine, said blading of the fan being tiered to provide at least two concentric annular flow paths, with means provided for adjusting the position of the blading portions of at least one such flow path thereby to afford the flow variation.

References Cited

FOREIGN PATENTS

| | | |
|---|---|---|
| 244,980 | 6/1947 | Switzerland. |
| 595,357 | 12/1947 | Great Britain. |
| 866,145 | 2/1953 | Germany. |

ROBERT M. WALKER, Primary Examiner

U.S. Cl. X.R.

60—226, 262